United States Patent
Kong et al.

(10) Patent No.: US 10,743,225 B2
(45) Date of Patent: Aug. 11, 2020

(54) SCHEDULING METHOD AND BASE STATION

(71) Applicant: Huawei Technologies Co., Ltd., Shenzhen, Guangdong (CN)

(72) Inventors: Xiangzhen Kong, Shanghai (CN); Lian Li, Shanghai (CN); Chao Qin, Shanghai (CN); Meiling Wang, Shanghai (CN); Jiao Zheng, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/228,149

(22) Filed: Dec. 20, 2018

(65) Prior Publication Data
US 2019/0124571 A1 Apr. 25, 2019

Related U.S. Application Data

(63) Continuation of application No. PCT/CN2016/087029, filed on Jun. 24, 2016.

(51) Int. Cl.
*H04W 72/04* (2009.01)
*H04W 36/04* (2009.01)
(Continued)

(52) U.S. Cl.
CPC ....... *H04W 36/04* (2013.01); *H04W 28/0278* (2013.01); *H04W 36/0005* (2013.01);
(Continued)

(58) Field of Classification Search
CPC ........... H04W 72/0446; H04W 72/042; H04W 72/14; H04W 24/10; H04W 72/0413;
(Continued)

(56) References Cited

U.S. PATENT DOCUMENTS

2007/0121542 A1* 5/2007 Lohr .................. H04L 47/10
370/329
2007/0238463 A1 10/2007 Ogami
(Continued)

FOREIGN PATENT DOCUMENTS

CN 101035356 A 9/2007
CN 101048001 A 10/2007
(Continued)

OTHER PUBLICATIONS

Panasonic, Report of Handover Complete transmission discussion [online], 3GPP TSG-RAN WG2#60 R2-075433,total 7 pages.

*Primary Examiner* — Quan M Hua
(74) *Attorney, Agent, or Firm* — Womble Bond Dickinson (US) LLP

(57) ABSTRACT

Embodiments of the present disclosure provide a scheduling method and a base station. In a cell handover process, a target base station serving a target cell receives a random access request from a terminal, sends a random access response to the terminal according to the random access request, and proactively sends an uplink grant to the terminal after sending the random access response and prior to receiving a handover complete command from the terminal. By proactively sending the uplink grant, the target base station can perform uplink scheduling for UE before cell handover is completed, so as to reduce an uplink transmission latency caused by the cell handover.

20 Claims, 5 Drawing Sheets

(51) Int. Cl.
    *H04W 36/02*     (2009.01)
    *H04W 28/02*     (2009.01)
    *H04W 36/00*     (2009.01)
    *H04W 72/12*     (2009.01)
    *H04W 72/14*     (2009.01)
    *H04W 74/08*     (2009.01)

(52) U.S. Cl.
    CPC ....... *H04W 36/02* (2013.01); *H04W 72/0446* (2013.01); *H04W 72/1284* (2013.01); *H04W 72/14* (2013.01); *H04W 74/0833* (2013.01)

(58) Field of Classification Search
    CPC ......... H04W 72/0406; H04W 72/1268; H04W 74/0833; H04W 28/0278; H04W 64/006; H04W 68/005; H04W 72/04; H04W 72/0453; H04W 84/042; H04W 92/045
    See application file for complete search history.

(56) References Cited

U.S. PATENT DOCUMENTS

| | | |
|---|---|---|
| 2008/0268849 A1 | 10/2008 | Narasimha et al. |
| 2010/0330998 A1 | 12/2010 | Park et al. |
| 2011/0255492 A1 | 10/2011 | Dai et al. |
| 2011/0268085 A1* | 11/2011 | Barany ............ H04W 36/0033 370/331 |
| 2016/0135098 A1 | 5/2016 | Ahluwalia et al. |
| 2016/0205703 A1* | 7/2016 | Dudda .............. H04W 72/1289 455/452.1 |
| 2017/0034748 A1 | 2/2017 | Yoon et al. |
| 2017/0331577 A1* | 11/2017 | Parkvall ............... H04J 11/0079 |

FOREIGN PATENT DOCUMENTS

| | | |
|---|---|---|
| CN | 101300754 A | 11/2008 |
| CN | 101606419 A | 12/2009 |
| CN | 101778418 A | 7/2010 |
| CN | 103298130 A | 9/2013 |
| EP | 2378806 A1 | 10/2011 |
| EP | 2448329 A1 | 5/2012 |
| EP | 3131336 A1 | 2/2017 |
| JP | 2017514382 A | 6/2017 |
| WO | 2015156655 A1 | 10/2015 |

* cited by examiner

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Target base station | RAR | | | | | | | | | HO-CMP | Granted | Granted | Granted | Granted |
| Terminal | | | | | | | HO-CMP | | | | | | | |

FIG. 3

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Target base station | RAR | | | Granted | Granted | Granted | HO-CMP | Granted | Granted | HO-CMP | Granted | Granted | Granted | Granted |
| Terminal | | | | | | | | PUSCH | PUSCH | PUSCH | PUSCH | PUSCH | PUSCH | PUSCH |

FIG. 6

ND BASE
SCHEDULING METHOD AND BASE STATION

CROSS-REFERENCE TO RELATED APPLICATIONS

This application is a continuation of International Application No. PCT/CN2016/087029, filed on Jun. 24, 2016, the disclosure of which is incorporated herein by reference in its entirety.

TECHNICAL FIELD

Embodiments of the present disclosure relate to communications technologies, and in particular, to a scheduling method and a base station.

BACKGROUND

In a wireless communications system, a base station allocates a radio resource to a terminal, to implement data transmission. The radio resource allocation process is also referred to as a scheduling process. Scheduling may include uplink scheduling and downlink scheduling. Uplink scheduling is used to allocate an uplink resource to the terminal, so that the terminal sends data on the uplink resource. Downlink scheduling is used to allocate a downlink resource to the terminal, so that the base station uses the downlink resource to send data to the terminal.

Uplink scheduling may be triggered by a scheduling request (SR) or a buffer status report (BSR). That is, when a terminal needs to send uplink data, the terminal may trigger, by reporting the SR or the BSR, a base station to allocate an uplink resource to the terminal. For example, referring to FIG. 1, FIG. 1 is a schematic diagram of an existing uplink scheduling process. As shown in FIG. 1, in the uplink scheduling process, when a terminal needs to send uplink data, the terminal sends an SR to a base station to inform the base station that the terminal needs to send the uplink data; and after receiving the SR, the base station delivers an uplink grant (UL Grant) to the terminal. The uplink grant indicates a resource allocated to the terminal. After receiving the uplink grant, the terminal sends a BSR by using the resource indicated by the uplink grant, to inform the base station of a volume of the uplink data to be sent by the terminal, so that the base station allocates more uplink resources to the terminal based on the BSR, and delivers an uplink grant. In this way, the terminal can continue transmitting uplink data by using a resource indicated by the uplink grant. In addition, the uplink data may also be sent while the BSR is being sent.

When a serving cell of the terminal changes (for example, handover occurs), or the terminal re-accesses the serving cell because of some reasons, the terminal also triggers uplink scheduling by sending an SR or a BSR. For example, when being handed over from a source cell to a target cell, the terminal reports an SR in the target cell, or sends a BSR when the handover is completed, to trigger uplink scheduling.

It can be learned that, in the prior art, the terminal can trigger uplink scheduling only after handover on the terminal is completed. A relatively long time is required for cell handover. As a result, an uplink data transmission latency of the terminal is relatively long, thereby affecting user experience. In particular, for a service with a relatively high latency requirement (such as a voice service), such latency is even unacceptable.

SUMMARY

Embodiments of the present disclosure provide a scheduling method and a base station, so as to reduce an uplink transmission latency caused by cell handover.

According to a first aspect, this application provides a scheduling method, where the method is applied to a process of handing over a terminal to a target cell, and the method includes: receiving, by a target base station, a random access request sent by the terminal; sending a random access response to the terminal according to the random access request; and proactively sending an uplink grant to the terminal after sending the random access response and before receiving a handover complete command. The target base station is a base station serving the target cell. By proactively sending the uplink grant, the target base station can perform uplink scheduling for UE before cell handover is completed, so as to reduce an uplink transmission latency caused by the cell handover.

In one embodiment, when receiving the handover complete command sent by the terminal, the target base station stops proactively sending the uplink grant to the terminal. By stopping, based on the handover complete command, proactively sending the uplink grant, a resource waste caused because excessive uplink resources are allocated through proactive granting is reduced, and it can be ensured that an uplink resource is allocated to the terminal according to an existing scheduling manner after the handover succeeds.

In another embodiment, proactively sending, by the target base station, an uplink grant to the terminal includes: sending, by the target base station, a plurality of uplink grants to the terminal in a preset time period; and after the preset time period expires, stopping proactively sending the uplink grants to the terminal.

In yet another embodiment, after starting to proactively send the uplink grant, the target base station receives a BSR or an SR sent by the terminal, and stops, based on the BSR or the SR, proactively sending the uplink grant to the terminal. By stopping, based on the BSR or the SR, proactively sending the uplink grant, a resource waste caused because excessive uplink resources are allocated through proactive granting is reduced. In addition, the BSR or the SR is sent when the terminal needs to send uplink data; therefore, a case in which a requirement of the terminal cannot be met because excessive few resources are allocated due to stop of proactive uplink-grant sending is further avoided.

In still another embodiment, before proactively sending the uplink grant to the terminal, the target base station may further determine whether the terminal currently has a voice service, and only when the terminal currently has a voice service, the target base station proactively sends the uplink grant to the terminal. Determining whether a voice service currently exists can reduce an uplink resource waste caused because proactive granting is used for some services whose latency requirements are not high.

In another embodiment, proactively sending, by the target base station, an uplink grant to the terminal includes: after sending the random access response, increasing, by the target base station, a size of the buffer status report BSR of the terminal; allocating an uplink resource to the terminal based on an increased size of the BSR; and then proactively sending, to the terminal, an uplink grant that is used to indicate the uplink resource.

In one embodiment, increasing, by the target base station, a size of the BSR of the terminal includes: increasing, by the target base station, the size of the BSR of the terminal based on a current service attribute of the terminal; or increasing, by the target base station, the size of the BSR based on a preset size. According to the method for increasing the size of the BSR based on the service attribute, uplink resource utilization can be improved, a resource waste caused because excessive uplink resources are allocated can be reduced, and a case in which a requirement of the terminal cannot be met because excessive few uplink resources are allocated can further be avoided.

In one embodiment, proactively sending, by the target base station, an uplink grant to the terminal includes: periodically and proactively sending, by the target base station, an uplink grant of a preset size to the terminal.

In another embodiment, proactively sending, by the target base station, an uplink grant to the terminal after sending the random access response and before receiving a handover complete command includes: starting, by the target base station, to send the uplink grant to the terminal from an $N^{th}$ TTI that is after the random access response is sent, where N is a positive integer greater than or equal to 3 and less than or equal to 10.

In one embodiment, the target base station starts to send a plurality of uplink grants to the terminal from the $N^{th}$ transmission time interval TTI that is after the random access response is sent.

According to a second aspect, this application provides a base station, where the base station includes function modules or means for performing the method provided in any one of the first aspect and the implementations of the first aspect.

According to a third aspect, this application provides a base station, where the base station includes a processor and a memory, the memory is configured to store a program, and the processor invokes the program stored in the memory, so as to perform the method provided in the first aspect of this application.

In the foregoing aspects, the target base station proactively sends the uplink grant to the terminal after sending the random access response and before receiving the handover complete command. By proactively sending the uplink grant, the target base station can perform uplink scheduling for UE before cell handover is completed, so as to reduce an uplink transmission latency caused by the cell handover.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may derive other drawings from these accompanying drawings without creative efforts.

FIG. 3 is a time sequence diagram of an uplink scheduling process shown in FIG. 2;

FIG. 6 is a time sequence diagram of an uplink scheduling process according to one embodiment;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by persons of ordinary skill in the art based on the embodiments of the present disclosure without creative efforts shall fall within the protection scope of the present disclosure.

The following describes some terms in this application for ease of understanding by persons skilled in the art.

(1) A terminal, also referred to as user equipment (UE), is a device providing voice and/or data connectivity to a user, such as a handheld device or an in-vehicle device with a wireless connection function. For example, a common terminal includes a mobile phone, a tablet computer, a notebook computer, a palmtop computer, a mobile internet device (MID), or a wearable device such as a smartwatch, a smart band, or a pedometer.

(2) A radio access network (RAN) device is a device that connects a terminal to a wireless network and is also referred to as a base station. The radio access network device includes but is not limited to: an evolved NodeB (eNB), a radio network controller (RNC), a NodeB (NB), a base station controller (BSC), a base transceiver station (BTS), a home evolved NodeB or a home NodeB (for example, Home evolved NodeB, or Home Node B, HNB), or a baseband unit (BBU). In addition, the radio access network device may include a wireless-fidelity (Wifi) access point (AP), or the like.

(3) "A plurality of" means two or more than two. "And/or" describes an association relationship of associated objects and represents that three relationships may exist. For example, A and/or B may represent any of the following three cases: Only A exists, both A and B exist, or only B exists. The character "/" generally indicates an "or" relationship between the associated objects before and after the character.

Figure 1:
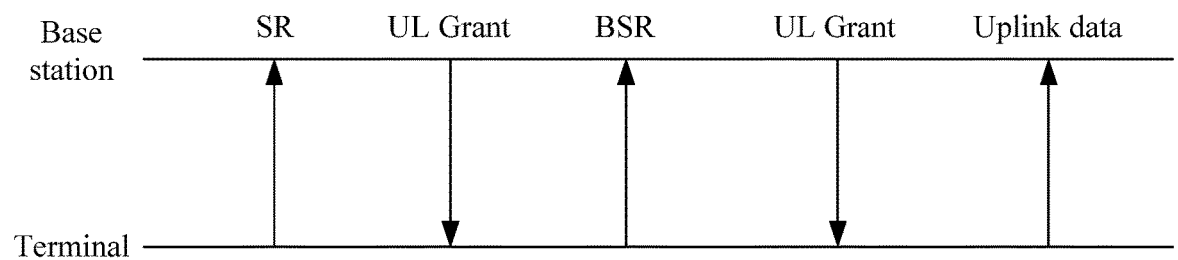
FIG. 1 is a schematic diagram of an existing uplink scheduling process.
Figure 2:
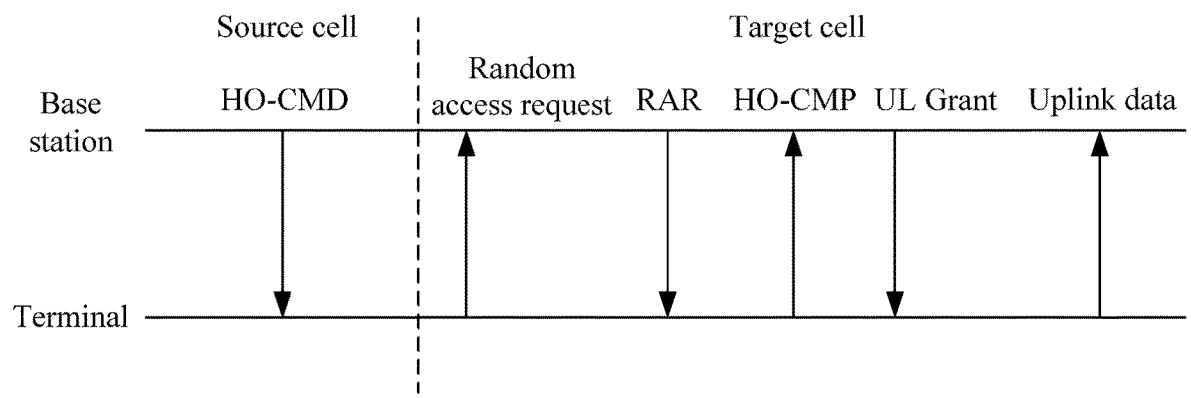
FIG. 2 is a schematic diagram of uplink scheduling in an existing cell handover process.

Referring to FIG. 2, FIG. 2 is a schematic diagram of uplink scheduling in an existing cell handover process. As shown in FIG. 2, when a terminal needs to be handed over from a source cell to a target cell, a base station serving the source cell (referred to as a source base station below) sends a handover command (HO-CMD for short) to the terminal. After receiving the handover command, the terminal sends a random access request to a base station serving the target cell (referred to as a target base station below). The target base station sends a random access response (RAR) to the terminal according to the random access request. Then, the terminal sends a handover complete command (HO-CMP) to the target base station. The handover complete command may carry a buffer status report (BSR). After receiving the handover complete command, the target base station discovers the BSR carried in the handover complete command, and learns that the terminal needs to send uplink data; therefore, the target base station allocates an uplink resource to the terminal based on the BSR, and sends an uplink grant to the terminal, to indicate the uplink resource allocated to the terminal. Subsequently, the terminal can use the uplink resource indicated by the uplink grant to send the uplink data to the target base station.

It can be learned that, the terminal can trigger uplink scheduling only after handover on the terminal is completed. A relatively long time is required for cell handover. As a result, a specific uplink data transmission latency of the terminal is caused, thereby affecting user experience. In particular, for a latency-sensitive service such as a voice service, such latency is even unacceptable.

Referring to FIG. 3, FIG. 3 is a time sequence diagram of an uplink scheduling process shown in FIG. 2. In FIG. 3, a Long Term Evolution (LTE) system is used as an example. As shown in FIG. 3, a first row represents time, and a unit is a transmission time interval (TTI); a second row represents actions of a target base station; and a third row represents actions of a terminal. It is assumed that the target base station sends a random access response to the terminal in a TTI 0, the terminal sends a handover complete command to the target base station in a TTI 6, and the target base station receives the handover complete command in a TTI 9 and starts to send an uplink grant from a TTI 10. If there is a relatively large amount of data to be sent by the terminal, the base station may send uplink grants to the terminal for a plurality of times, for example, uplink grants are sent in all of TTIs 10 to 13. It should be noted that, a time in which the target base station receives the handover complete command is not fixed but may be a TTI 8, the TTI 9, or the TTI 10. Correspondingly, when the time in which the target base station receives the handover complete command is the TTI 8, a time in which the target base station starts to send the uplink grant to the terminal may be the TTI 9, or when the time in which the target base station receives the handover complete command is the TTI 10, the target base station may start to send the uplink grant to the terminal in the TTI 11. It may be learned from the foregoing time sequence relationship that, from sending the random access response to starting to send the uplink grant, the target base station needs a time of at least 8 to 10 TTIs. Therefore, for a latency-sensitive service such as a voice service, user experience is severely affected.

To reduce an uplink data transmission latency, an embodiment of the present disclosure provides a scheduling method. In a cell handover process, after sending a random access response and before receiving a handover complete command, a target base station proactively sends an uplink grant to a terminal. By proactively sending the uplink grant, the target base station can perform uplink scheduling for UE before cell handover is completed, so as to reduce a latency caused by the cell handover. The following describes the method in the present disclosure in detail by using specific embodiments.

In addition, it should be noted that, when the foregoing handover is inter-cell handover, a source cell and a target cell are different cells, and the source cell and the target cell may be served by a same base station or may be served by different base stations. In other words, a source base station and a target base station may be a same base station or may be different base stations. When the foregoing handover is intra-cell handover, a source cell and a target cell may be a same cell, and a target base station is a source base station.

Figure 4:
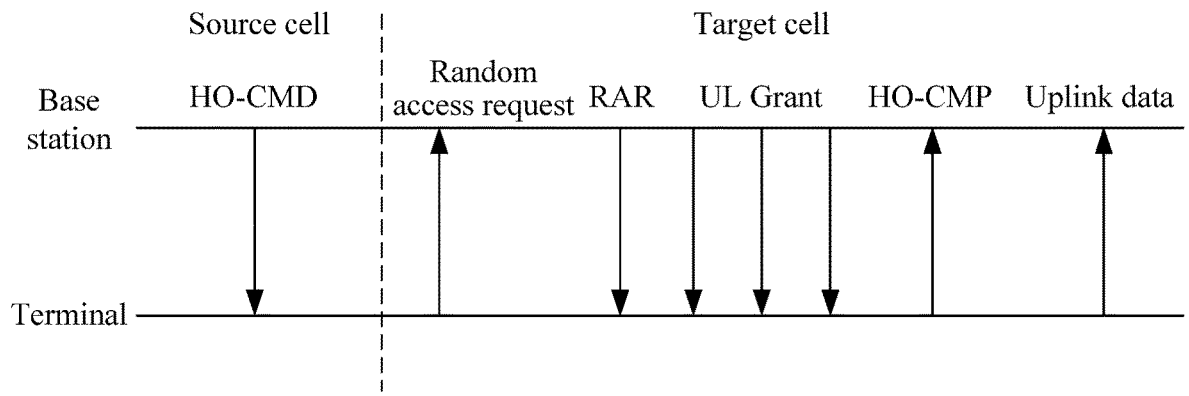
FIG. 4 is a schematic diagram of uplink scheduling in a cell handover process according to one embodiment.

Referring to FIG. 4, FIG. 4 is a schematic diagram of uplink scheduling in a cell handover process according to one embodiment. As shown in FIG. 4, a difference between FIG. 4 and FIG. 2 lies in that, after sending a random access response and before receiving a handover complete command, a target base station proactively sends an uplink grant to a terminal. In addition, the target base station may consecutively send uplink grants for a plurality of times, or may send an uplink grant for only once.

Figure 5:
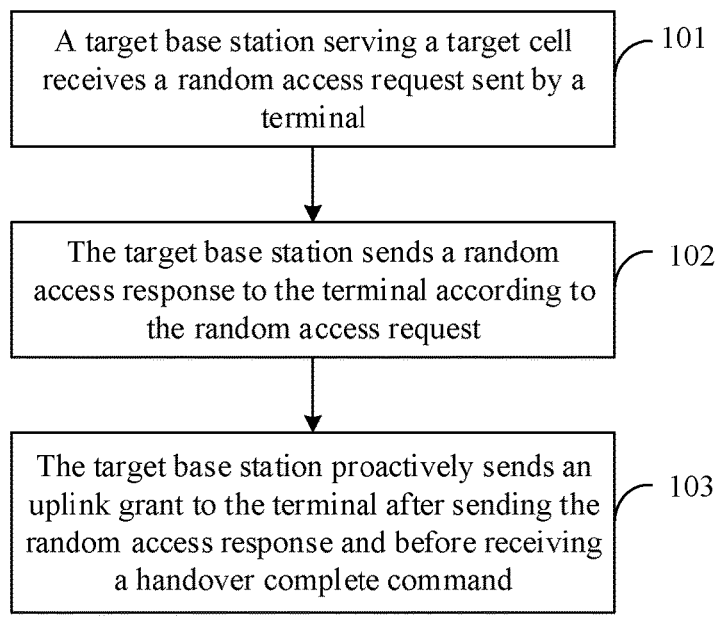
FIG. 5 is a flowchart of a scheduling method according to one embodiment.

FIG. 5 is a flowchart of a scheduling method according to one embodiment. The method is applied to a process of handing over a terminal to a target cell. As shown in FIG. 5, the method in this embodiment may include the following steps:

Step 101. A target base station serving the target cell receives a random access request sent by the terminal.

Step 102. The target base station sends a random access response to the terminal according to the random access request.

Step 103. The target base station proactively sends an uplink grant to the terminal after sending the random access response and before receiving a handover complete command.

In step 103, the target base station proactively sends the uplink grant to the terminal after sending the random access response and before receiving the handover complete command.

Herein, proactive sending means that the target base station sends the uplink grant to the terminal when the target base station does not receive an SR or a BSR sent by the terminal. An existing uplink scheduling procedure is as follows: After cell handover is completed, when a terminal needs to send uplink data, the terminal adds a BSR to a handover complete command sent to a target base station, and after receiving the handover complete command, the target base station allocates a resource to the terminal based on the BSR, and delivers an uplink grant. Alternatively, after a target base station receives a handover complete command sent by a terminal, the terminal sends an SR to the target base station. Usually, the SR is used to inform the target base station only that the terminal needs to send data but does not be used to inform the target base station of a specific volume of data that needs to be sent by the terminal. The target base station allocates a resource to the terminal based on the SR, and delivers an uplink grant. In this case, because the target base station does not know a specific quantity of uplink resources that are needed by the terminal, the target base station may allocate, to the terminal, only an uplink resource that is used to send the BSR, and the terminal sends the BSR on the uplink resource that is granted. The BSR carries a volume of data that needs to be sent by the terminal, and the target base station provides the grant to the terminal based on the BSR. After obtaining the uplink grant, the terminal may alternatively add the BSR to an uplink subframe if the terminal further needs to send data subsequently. The target base station continues providing a grant to the terminal based on the BSR. Certainly, the target base station may alternatively allocate a resource of a preset size to the terminal after receiving the SR, and the terminal uses the resource to send the BSR, and in addition, uses a rest portion of the resource to send the uplink data. In the solution of this embodiment, when the terminal has not been handed over to the target base station yet, the terminal cannot send the SR or the BSR to the target base station. In this case, the terminal may need to transmit data. To ensure that the data of the terminal can be transmitted in time, the target base station sends the uplink grant to the terminal even if the target base station does not receive the SR or the BSR.

The target base station may send the uplink grant in any time after sending the random access response and before receiving the handover complete command. In an existing network system, such as a Universal Mobile Telecommunications System (UMTS) or an LTE system, a TTI is usually used as a basic unit of time that is managed in radio resource management (for example, scheduling), and one TTI is one millisecond (ms), that is, a length of a subframe. Certainly, with evolution of technologies, a length of the TTI may be another value, for example, 0.5 ms. This is not used to limit the present disclosure. The target base station may start to proactively send the uplink grant to the terminal from an $N^{th}$ TTI that is after the random access response is sent. N is a positive integer greater than or equal to 3 and less than or equal to 10. When a time in which the target base station receives the handover complete command is a TTI 8, a maximum value of N is 8; when a time in which the target base station receives the handover complete command is a TTI 9, a maximum value of N is 9; or when a time in which the target base station receives the handover complete command is a TTI 10, a maximum value of N is 10.

In this embodiment, a quantity of uplink grants that are proactively sent by the target base station is not limited. The target base station may start to send one uplink grant or a plurality of uplink grants from the $N^{th}$ TTI that is after the random access response is sent. During sending of the plurality of uplink grants, the uplink grants may be consecutively or inconsecutively sent. That is, the target base station may start to consecutively send the uplink grants from the $N^{th}$ TTI that is after the random access response is sent, or may start to inconsecutively send the uplink grants from the $N^{th}$ TTI that is after the random access response is sent. For example, the target base station sends one uplink grant every other TTI or sends one uplink grant every other two TTIs. A value of N may be preset, or may be determined in real time by the target base station according to a preset rule. For different services of the terminal, values of N may be the same or may be different. The value of N may be determined based on latency sensitivity of a service. The value of N for a latency-sensitive service may be less than that for a latency-insensitive service. For example, for the latency-sensitive service, the value of N is 3, and for the latency-insensitive service, the value of N may be 6.

When the value of N is 3, the target base station starts to proactively send the uplink grant to the terminal from a third TTI that is after the random access response is sent. FIG. 6 is a time sequence diagram of an uplink scheduling process according to one embodiment. As shown in FIG. 6, it is assumed that a target base station sends a random access response in a TTI 0, the target base station starts to send an uplink grant from a TTI 3, a terminal sends a handover complete command to the target base station in a TTI 6, and the target base station receives the handover complete command in a TTI 9. According to a mechanism in the foregoing embodiment, the target base station starts to send the uplink grant from the TTI 3, and the terminal starts to perform physical uplink shared channel (PUSCH) transmission at an interval of four TTIs, that is, the terminal starts to perform the PUSCH transmission from a TTI 7. By comparing FIG. 2 and FIG. 6, it can be learned that, in the method in this embodiment, the target base station starts to send the uplink grant from the TTI 3. Compared with the prior art in which a target base station can start to send an uplink grant as early as in a TTI 10, a latency decreases from nine TTIs to three TTIs, that is, the latency decreases by six TTIs.

There may be a plurality of implementations in which the target base station proactively sends the uplink grant to the terminal. For example, the target base station periodically and proactively sends an uplink grant of a preset size to the terminal; for another example, the target base station proactively increases a size of a BSR of the terminal, and triggers the uplink grant based on the increased size of the BSR. The size of the BSR is maintained as a buffer size value (BS value) in the base station and the terminal. The terminal reports an index to the base station based on a size of a BSR of the terminal. The index is used to indicate the size of the BSR. After receiving the index, the base station updates a size of a BSR that is maintained by the base station, allocates an uplink resource to the terminal based on an updated size of the BSR, and delivers a grant. In this embodiment of this application, the target base station increases the size of the BSR by itself, triggers uplink resource allocation for the terminal, and delivers the grant. In a process of increasing the size of the BSR, the size of the BSR may be automatically and periodically increased or may be increased all at a time based on a preset size, or may be increased based on a service attribute of the terminal. For example, when a current service of the terminal is a voice service, a voice packet size may be estimated, and the size of the BSR may be proactively increased based on the voice packet size.

According to the method for increasing the size of the BSR based on the service attribute, uplink resource utilization can be improved, a resource waste caused because excessive uplink resources are allocated can be reduced, and a case in which a requirement of the terminal cannot be met because excessive few uplink resources are allocated can further be avoided.

In the foregoing method, the target base station determines, based on the current service attribute of the terminal, a quantity of uplink grants that are to be sent. For example, the service attribute is a latency attribute. For a latency-sensitive service, to minimize a latency, the target base station may choose to ensure the latency at a cost of wasting some uplink resources; therefore, a value of M is relatively large, and correspondingly, a value of a quantity L of uplink grants allocated by the target base station is also large. For a latency-insensitive service, to avoid an uplink resource waste, a value of M is relatively small, and correspondingly, a value of a quantity L of uplink grants allocated by the target base station is also small. The service attribute may alternatively be a service data type, and the service data type includes types such as text, image, video, and audio. For a video service and an audio service, to improve user experience, values of M and L are relatively large. For a text or an image, to avoid an uplink resource waste, values of M and L are relatively small. The foregoing are merely examples for description, the service attribute is not limited to the latency attribute and the data type, and may further be another attribute.

In this embodiment, the target base station proactively sends the uplink grant before receiving the handover complete command and still performs scheduling in an existing uplink scheduling manner after receiving the handover complete command. The target base station may stop proactively sending the uplink grant in the following cases:

(1) The target base station receives the handover complete command sent by the terminal, and stops, based on the handover complete command, proactively sending the uplink grant to the terminal.

(2) The target base station sends a plurality of uplink grants to the terminal in a preset time period, and after the time period expires, the target base station stops proactively sending the uplink grants to the terminal. The preset time period may be a plurality of TTIs, in the plurality of TTIs, the target base station proactively sends the uplink grants to the terminal, and when the plurality of TTIs end, the target base station stops proactively sending the uplink grants to the terminal.

(3) The target base station receives a BSR or an SR sent by the terminal, and stops, based on the BSR or the SR, proactively sending the uplink grant to the terminal. That the terminal sends the SR to the target base station indicates that the terminal has been handed over to the target cell and needs to send data. In this case, scheduling may be performed based on the existing uplink scheduling manner. Therefore, the target base station stops proactively sending the uplink grant to the terminal. Alternatively, the terminal adds a BSR to the handover complete command, and the target base station stops, based on the BSR carried in the handover complete command, proactively sending the uplink grant to the terminal. Alternatively, after the target base station proactively sends the uplink grant, the terminal sends a BSR on a granted uplink resource, and the target base station stops, based on the BSR, proactively sending the uplink grant to the terminal.

The method in this embodiment may be applied to various services, such as a voice service, a video service, and a text service. The voice service is a latency-sensitive service, and a latency that is caused by cell handover causes blocking of uplink voice packets of the terminal. As a result, a specific packet latency is caused, call quality temporarily deteriorates, and voice user experience is affected. In one embodiment, before step 103, the target base station may further determine whether the terminal currently has a voice service, and when the terminal currently has a voice service, the target base station proactively sends the uplink grant to the terminal after sending the random access response and before receiving the handover complete command. When the terminal currently does not have a voice service, the target base station starts to perform scheduling for the terminal after the terminal is handed over to the target cell.

It should be noted that the voice service in this embodiment is a collective name for a type of services. The type of services have a same quality of service (QoS for short) requirement, and the QoS requirement may be represented by using a QoS class identifier (QCI for short). The target base station may determine, based on the QCI, whether the terminal currently has a voice service to be transmitted. For example, a QCI 1, a QCI 2, and a QCI 5 are all voice-related QCIs. The QCI 1 bears a voice service, the QCI 2 bears a video service, and the QCI 5 bears Session Initiation Protocol (SIP for short) singling of the voice service, such as SIP signaling used to establish or release the voice service. When the voice service is being established, the SIP signaling is sent to a core network device by using the QCI 5, so that the core network device is triggered to establish a QCI 1 bearer to establish the voice service, or a QCI 1 bearer and a QCI 2 bearer need to be established to implement a videophone service. When the voice service ends, corresponding SIP signaling is transmitted on the QCI 5, to trigger the CN device to release the QCI 1 to end the voice service; or for the videophone service, the CN device is triggered to release the QCI 1 and the QCI 2, and it is considered that a call ends. Therefore, during determining, by the target base station, whether the terminal is performing the voice service, whether the voice service starts and ends may be determined by using the SIP signaling transmitted on the QCI 5, or may be determined by using the QCI 1 bearer.

In this embodiment, in the cell handover process, the target base station serving the target cell receives the random access request sent by the terminal, sends the random access response to the terminal according to the random access request, and proactively sends the uplink grant to the terminal after sending the random access response and before receiving the handover complete command. By proactively sending the uplink grant, the target base station can perform uplink scheduling for UE before cell handover is completed, so as to reduce an uplink transmission latency caused by the cell handover.

Figure 7:
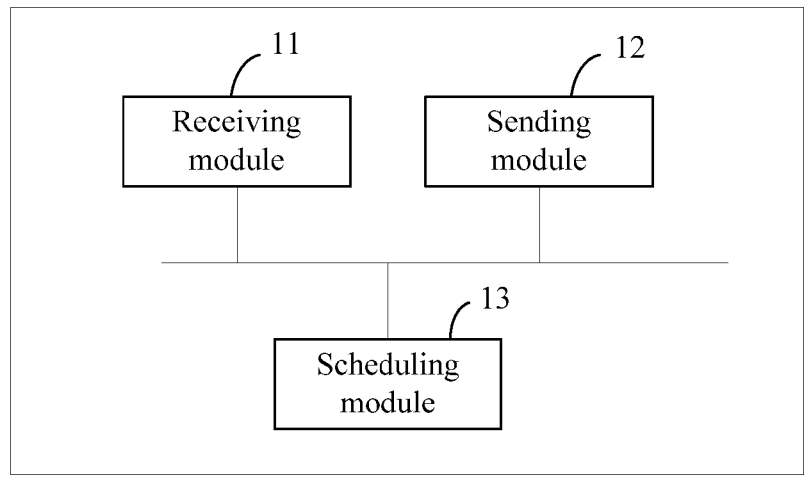
FIG. 7 is a schematic structural diagram of a base station according to one embodiment.

FIG. 7 is a schematic structural diagram of a base station according to one embodiment. The base station is a target base station serving a target cell to which a terminal is handed over. As shown in FIG. 7, the base station includes a receiving module 11, a sending module 12, and a scheduling module 13.

The receiving module 11 is configured to receive a random access request sent by the terminal.

The sending module 12 is configured to send a random access response to the terminal according to the random access request.

The scheduling module 13 is configured to: after the sending module 12 sends the random access response and before the receiving module 11 receives a handover complete command, proactively send an uplink grant to the terminal though the sending module 12.

In one embodiment, the scheduling module 13 is further configured to: when the receiving module 11 receives the handover complete command sent by the terminal, control the sending module 12 to stop proactively sending the uplink grant to the terminal.

In one embodiment, the scheduling module 13 is configured to: send a plurality of uplink grants to the terminal in a preset time period through the sending module 12; and control the sending module 12 to stop, after the preset time period expires, proactively sending the uplink grants to the terminal.

In one embodiment, the receiving module 11 is further configured to receive a BSR or an SR sent by the terminal. Correspondingly, the scheduling module 13 is further configured to control, based on the BSR or the SR, the sending module 12 to stop proactively sending the uplink grant to the terminal.

In one embodiment, the base station further includes a determining module (not shown in FIG. 7). The determining module is configured to determine whether the terminal currently has a voice service. In one embodiment, the scheduling module 13 is configured to:

when the terminal currently has a voice service, after the sending module 12 sends the random access response and before the receiving module 11 receives the handover complete command, proactively send the uplink grant to the terminal through the sending module 12.

In one embodiment, the scheduling module 13 proactively sends the uplink grant to the terminal in the following manners:

After the sending module 12 sends the random access response, a size of the BSR of the terminal is increased; an uplink resource is allocated to the terminal based on an increased size of the BSR; and an uplink grant that is used to indicate the uplink resource is proactively sent to the terminal through the sending module 12. In one embodiment, the scheduling module increases the size of the BSR of the terminal based on a current service attribute of the terminal; or increases the size of the BSR based on a preset size.

Alternatively, an uplink grant of a preset size is periodically and proactively sent to the terminal.

Alternatively, the uplink grant starts to be sent to the terminal through the sending module 12 from an $N^{th}$ TTI that is after the sending module 12 sends the random access response. N is a positive integer greater than or equal to 3 and less than or equal to 10. In one embodiment, the scheduling module starts to send a plurality of uplink grants to the terminal from the $N^{th}$ TTI through the sending module 12.

The base station shown in FIG. 7 may be configured to perform the method provided in the foregoing method embodiment. Specific implementations and technical effects are similar to those of the method provided in the foregoing method embodiment, and details are not described herein again.

It should be noted that the foregoing division of modules of the base station is merely logical function division, and during actual implementation, some or all of the modules may be integrated into one physical entity, or the modules may be physically separated. In addition, all the modules may be implemented by invoking software by a processing element; or all the modules may be implemented by hardware; or some modules may be implemented by invoking software by a processing element, and some modules may be implemented by hardware. For example, the scheduling module may be an independently disposed processing element, or may be integrated into a chip of the base station for implementation. In addition, the scheduling module may alternatively be stored in a memory of the base station in a form of program code, and is invoked by a processing element of the base station, to execute the foregoing functions of the scheduling module. Implementation of other modules is similar to that of the scheduling module. In addition, all or some of the modules may be integrated, or may be implemented independently. Herein, the processing element may be an integrated circuit with a signal processing capability. During implementation, the steps of the foregoing methods or the foregoing modules may be implemented by using an integrated logic circuit of hardware in the processor element, or by using a software instruction.

For example, the foregoing modules may be configured as one or more integrated circuits that implement the foregoing methods, such as one or more application-specific integrated circuits (ASIC), one or more microprocessors (digital signal processor, DSP), or one or more field programmable gate arrays (FPGA). For another example, when one of the foregoing modules is implemented by invoking program code by a processing element, the processing element may be a general purpose processor, such as a central processing unit (CPU), or another processor that can invoke program code. For still another example, the modules may be integrated together and implemented in a system-on-a-chip (SOC) form.

Figure 8:
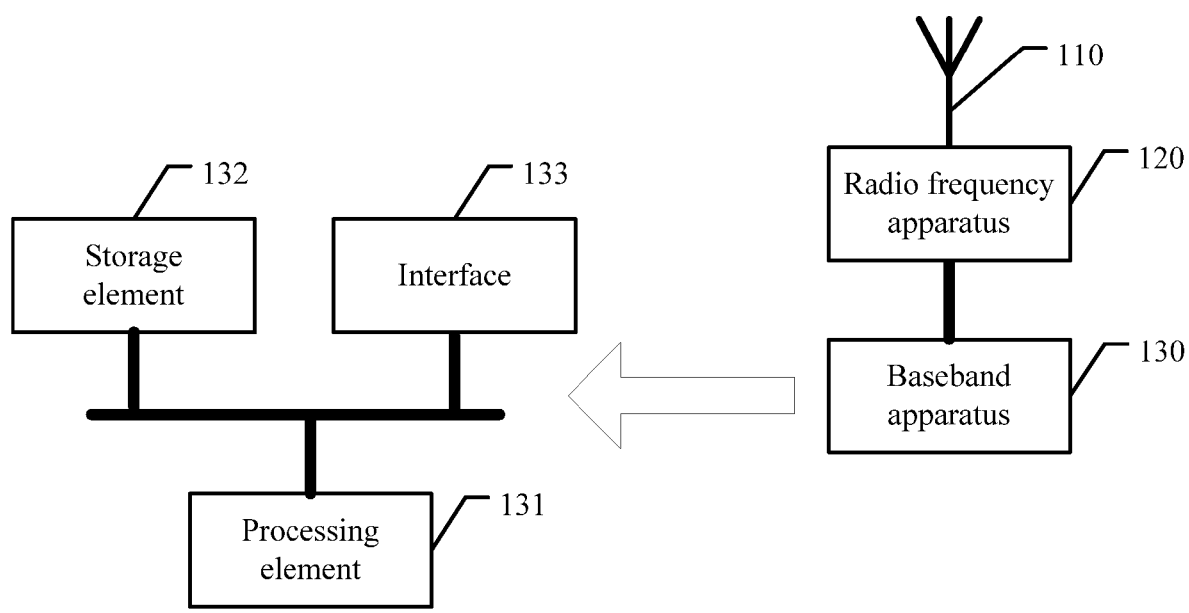
FIG. 8 is a schematic structural diagram of another base station according to one embodiment.

FIG. 8 is a schematic structural diagram of another base station according to one embodiment. As shown in FIG. 8, the base station in this embodiment includes an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal, and sends the information sent by the terminal to the baseband apparatus 130 for processing. In a downlink direction, the baseband apparatus 130 processes information to be sent to the terminal, and sends processed information to the radio frequency apparatus 120. After processing the information to be sent to the terminal, the radio frequency apparatus 120 sends processed information to the terminal through the antenna 110.

The method provided in the foregoing embodiment may be implemented in the baseband apparatus 130. The baseband apparatus 130 includes a processing element 131 and a storage element 132. For example, the baseband apparatus 130 may include at least one baseband processing board. A plurality of chips are disposed on the baseband processing board. As shown in FIG. 8, for example, one of the chips is the processing element 131 and is connected to the storage element 132, to invoke a program in the storage element 132, so as to execute an operation shown in the foregoing method embodiment. The baseband apparatus 130 may further include an interface 133, configured to exchange information with the radio frequency apparatus 120. For example, the interface is a common public radio interface (CPRI).

Herein, the processing element may be one processor, or may be a collective name for a plurality of processing elements. For example, the processing element may be a CPU or an ASIC, or may be configured as one or more integrated circuits that implement the foregoing methods, such as one or more microprocessors DSPs, or one or more field programmable gate arrays FPGAs. The storage element may be one memory or may be a collective name for a plurality of storage elements.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A scheduling method of handing a terminal over to a target cell, comprising:
   receiving, by a target base station serving the target cell, a random access request from the terminal;
   sending, by the target base station, a random access response to the terminal according to the random access request; and
   after sending the random access response and prior to receiving a handover complete command from the terminal, proactively sending, by the target base station, an uplink grant to the terminal, wherein proactively sending the uplink grant to the terminal comprises:
   after sending the random access response, increasing, by the target base station, a size of a buffer status report (BSR) of the terminal; and
   allocating, by the target base station, an uplink resource to the terminal based on the increase size of the BSR.

2. The method according to claim 1, further comprising:
   when receiving the handover complete command from the terminal, stopping, by the target base station, the proactive sending of the uplink grant to the terminal.

3. The method according to claim 1,
   wherein proactively sending the uplink grant to the terminal further comprises: sending, by the target base station, a plurality of uplink grants to the terminal in a preset time period; and
   further comprising: after the preset time period expires, stopping, by the target base station, the proactive sending of the uplink grants to the terminal.

4. The method according to claim 1, further comprising:
   receiving, by the target base station, the BSR or a scheduling request (SR) from the terminal; and
   stopping, by the target base station based on the BSR or the SR, the proactive sending of the uplink grant to the terminal.

5. The method according to claim 1, further comprising:
before proactively sending the uplink grant to the terminal, determining, by the target base station, whether the terminal currently has a voice service; and
in response to determining that the terminal currently has the voice service, proactively sending, by the target base station, the uplink grant to the terminal after sending the random access response and prior to receiving the handover complete command.

6. The method according to claim 1, wherein proactively sending the uplink grant to the terminal further comprises:
proactively sending, by the target base station to the terminal, an uplink grant that is used to indicate the uplink resource.

7. The method according to claim 1, wherein proactively sending the uplink grant to the terminal comprises:
periodically and proactively sending, by the target base station, an uplink grant of a preset size to the terminal.

8. The method according to claim 1, wherein proactively sending the uplink grant to the terminal after sending the random access response and prior to receiving the handover complete command comprises:
sending, by the target base station, the uplink grant to the terminal from an $N^{th}$ transmission time interval (TTI) that is after the random access response is sent, wherein N is a positive integer greater than or equal to 3 and less than or equal to 10.

9. The method according to claim 8, wherein sending the uplink grant to the terminal from the $N^{th}$ TTI that is after the random access response is sent comprises:
sending, by the target base station, a plurality of uplink grants to the terminal from the $N^{th}$ TTI that is after the random access response is sent.

10. A base station for serving as a target base station to a target cell to which a terminal is handed over, the base station comprising a processor and a non-transitory computer readable storage medium that stores a program, which when executed by the processor, causes the processor to perform operations, the operations comprising:
receiving a random access request from the terminal;
sending a random access response to the terminal according to the random access request; and
after sending the random access response and prior to receiving a handover complete command from the terminal, proactively sending an uplink grant to the terminal, wherein proactively sending the uplink grant to the terminal comprise:
after sending the random access response, increasing a size of a buffer status report (BSR) of the terminal; and
allocating an uplink resource to the terminal based on the increased size of the BSR.

11. The base station according to claim 10, wherein the operations further comprise:
when receiving the handover complete command from the terminal, stopping the proactive sending of the uplink grant to the terminal.

12. The base station according to claim 10,
wherein proactively sending the uplink grant to the terminal further comprises: sending a plurality of uplink grants to the terminal in a preset time period; and
wherein the operations further comprise: after the preset time period expires, stopping the proactive sending of the uplink grants to the terminal.

13. The base station according to claim 10, wherein the operations further comprise:
receiving the BSR or a scheduling request (SR) from the terminal; and
stopping, based on the BSR or the SR, the proactive sending of the uplink grant to the terminal.

14. The base station according to claim 10, wherein the operations further comprise:
determining whether the terminal currently has a voice service; and
in response to determining that the terminal currently has the voice service, proactively sending the uplink grant to the terminal after sending the random access response and prior to receiving the handover complete command.

15. The base station according to claim 10, wherein proactively sending the uplink grant to the terminal further comprises:
proactively sending an uplink grant that is used to indicate the uplink resource to the terminal.

16. The base station according to claim 10, wherein proactively sending the uplink grant to the terminal comprises:
periodically and proactively sending an uplink grant of a preset size to the terminal.

17. The base station according to claim 10, wherein proactively sending the uplink grant to the terminal comprises:
sending the uplink grant to the terminal from an $N^{th}$ transmission time interval (TTI) that is after the random access response is sent, wherein N is a positive integer greater than or equal to 3 and less than or equal to 10.

18. The base station according to claim 17, wherein sending the uplink grant to the terminal from the $N^{th}$ TI that is after the random access response is sent comprises:
sending a plurality of uplink grants to the terminal from the $N^{th}$ TI that is after the random access response is sent.

19. The base station according to claim 17, wherein a value of N is 3.

20. A non-transitory computer readable storage medium configured to store a program, which when being executed by a processor, causes the processor to perform operations, the operations comprising:
receiving a random access request from a terminal;
sending a random access response to the terminal according to the random access request; and
after sending the random access response and prior to receiving a handover complete command from the terminal, proactively sending an uplink grant to the terminal, wherein proactively sending the uplink grant to the terminal comprises:
after sending the random access response, increasing a size of a buffer status report (BSR) of the terminal; and
allocating an uplink resource to the terminal based on the increased size of the BSR.

* * * * *